Figure 4:
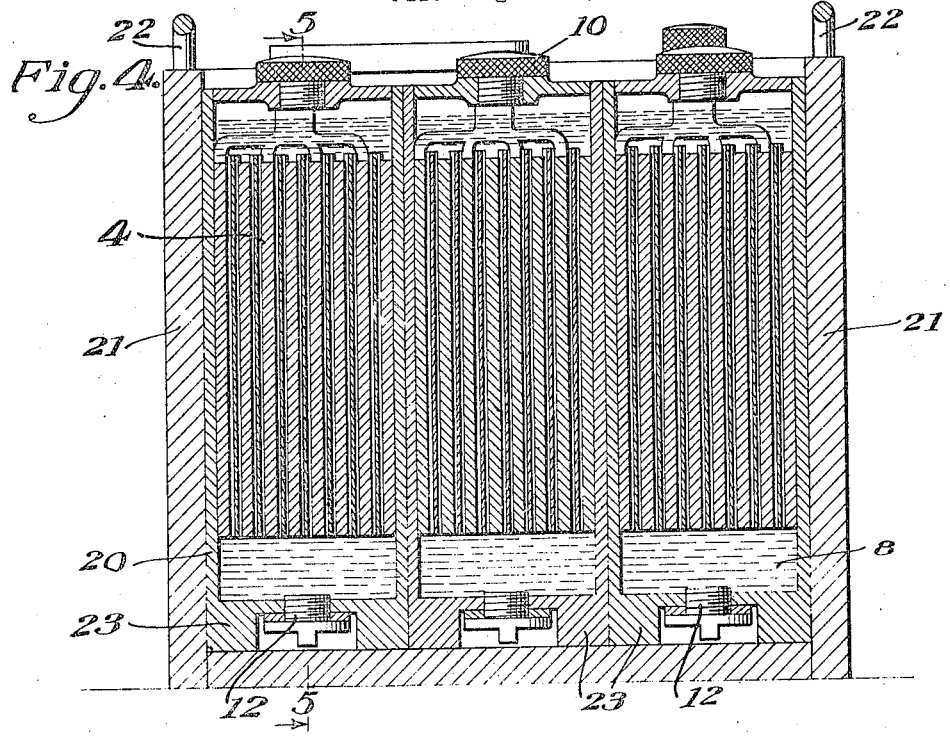

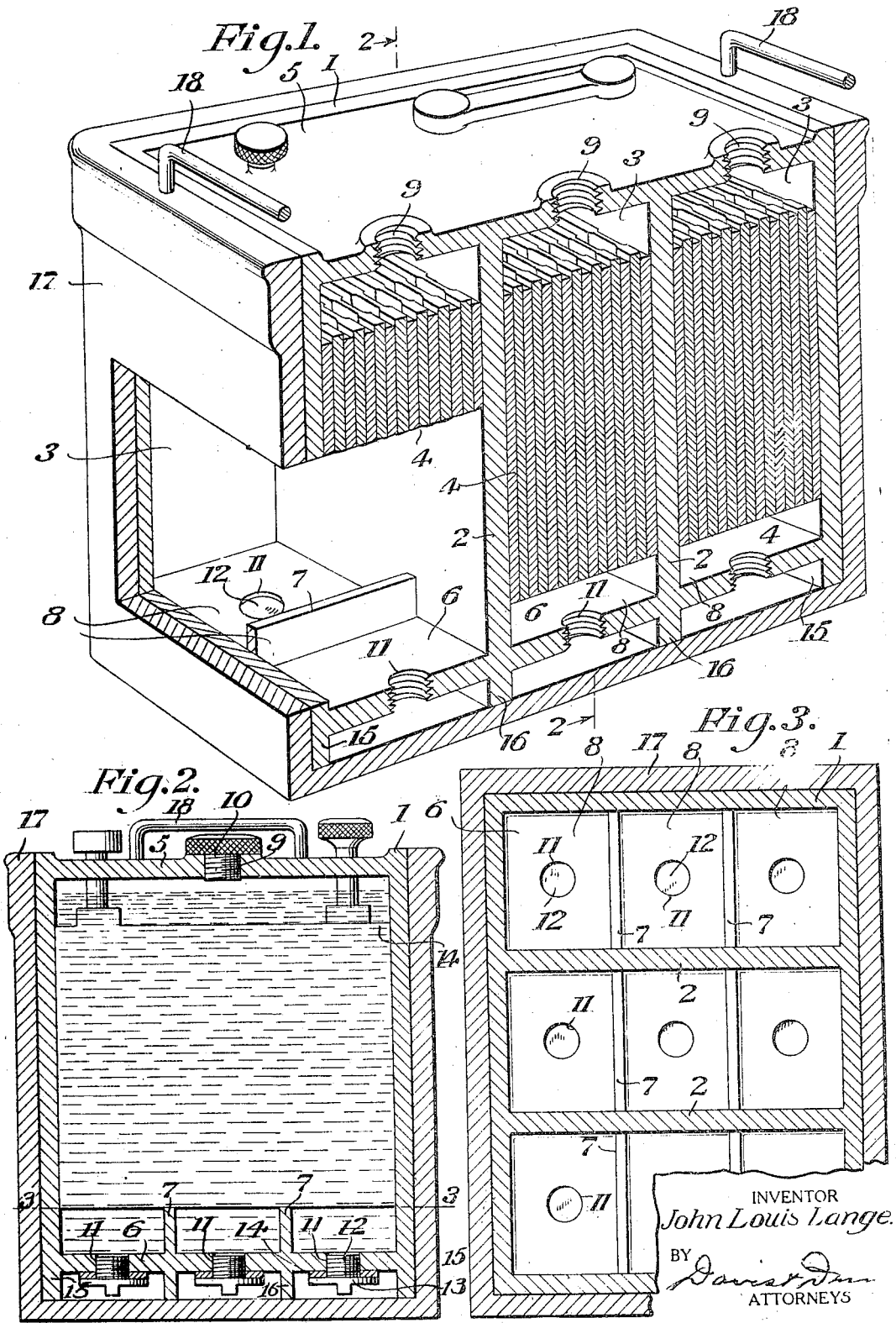

March 23, 1926. 1,577,91

J. L. LANGE

STORAGE BATTERY JAR

Filed August 28, 1925    2 Sheets-Sheet 2

INVENTOR
John Louis Lange.
BY
ATTORNEYS

Patented Mar. 23, 1926.

1,577,912

UNITED STATES PATENT OFFICE.

JOHN LOUIS LANGE, OF DUMONT, NEW JERSEY.

STORAGE-BATTERY JAR.

Application filed August 28, 1925. Serial No. 53,141.

*To all whom it may concern:*

Be it known that I, JOHN LOUIS LANGE, a citizen of the United States, and resident of Dumont, in the county of Bergen and State of New Jersey, have invented certain new and useful Improvements in Storage-Battery Jars, of which the following is a specification.

This invention relates to storage batteries and has for an object the provision of a battery so designed as to facilitate the thorough cleansing of its cells. A sediment is produced by the chemical action upon the battery plates within a cell. This sediment settles to the bottom of the cell and when a sufficient amount has accumulated it causes short circuiting. The present invention provides for the easy removal of the sediment and the thorough cleansing of the cell without the necessity of dismantling the battery.

A further object is to provide a battery adapted to have its cells cleaned by flushing and provided with means to effectually prevent leakage of the electrolyte from the cells over a supporting surface.

Figure 5:
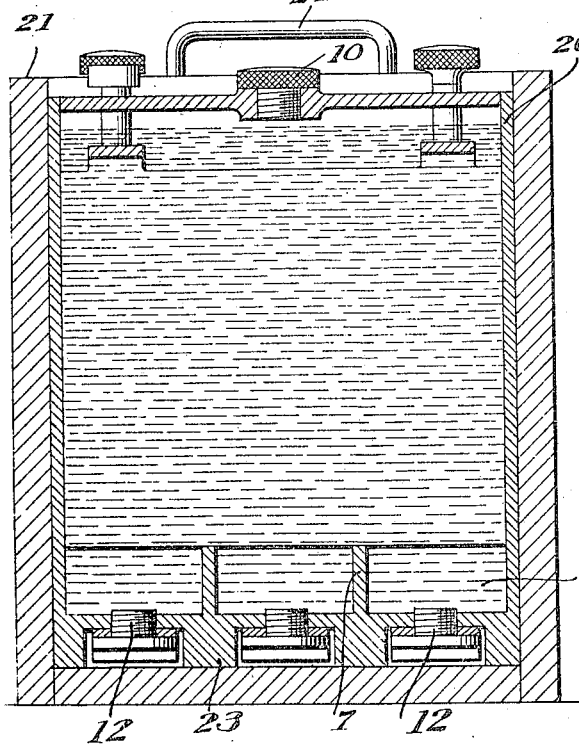

In the drawings:

Fig. 1 is a sectional perspective view of a battery showing my invention in its preferred form;

Fig. 2 a vertical section taken on the line 2—2 of Fig. 1;

Fig. 3 a horizontal section taken on the line 3—3 of Fig. 2;

Fig. 4 a vertical longitudinal sectional view of a battery showing a modified form of my invention;

Fig. 5 a vertical section on the line 5—5 of Fig. 4; and

Figure 6:
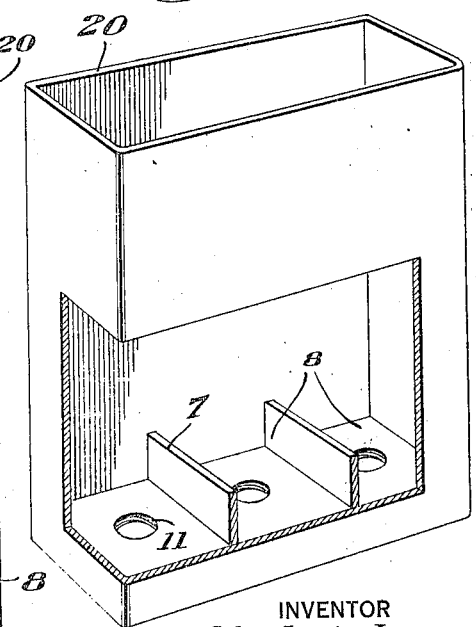

Fig. 6 a detail perspective view partly in section of one of the individual cell casings.

Referring to the parts by numerals, 1 designates a box-like jar or casing for a multiple cell storage battery. The casing 1 is closed upon all sides and its interior is divided by integrally formed vertical partitions 2 into a plurality of cell-chambers 3. Within each chamber 3 is a bank of battery plates 4. The different banks are electrically connected in the usual manner. Formed upon the bottom wall 6 of each cell chamber is a pair of spaced upstanding ribs 7. These ribs extend across the cell, divide the bottom thereof into three pockets 8 and serve to support the battery plates.

A plurality of threaded openings 9 are formed through the top wall 5 of the casing 1 and each opening is located centrally over one of the cell chambers 3. The cells are filled with the electrolyte through these openings and the openings are adapted to be closed by threaded plugs 10.

Formed through the bottom wall 6 of each cell are a plurality of threaded drain openings 11 each located centrally of the bottom of one of the pockets 8. These openings are closed by threaded plugs 12 which are screwed into the openings from the under side of the bottom 6. Each plug 12 is formed with an enlarged head 13 between which and the bottom 6 is interposed a washer 14 adapted to prevent leakage of the electrolyte from the cells. Supporting flanges 15 and 16 are formed upon the casing 1 and depend from its under side to support the bottom 6 elevated above a supporting surface and provide clearance for the projecting heads of the plugs 12. The outer ends of said projecting heads are formed to be engaged by a wrench.

When sediment accumulates in the pocket 8 of the cells as a result of chemical action upon the plates 14, the plugs 12 are unscrewed from the drain openings 11 to permit the electrolyte to drain from the cell. The plugs 10 are then unscrewed from the filling openings 9, and water or other cleansing fluid is charged into the cells. The water will flush the entire cell and drain out through the openings 11, carrying away the sediment and thoroughly cleansing both the battery plates and the pockets 8. This cleansing operation requires no skill and does not call for the dismantling of the battery parts. The battery may therefore be cleaned easily and frequently to maintain its efficiency and prolong its life.

A box-like container 17 is provided for the battery. This container is open at the top and is adapted to snugly receive the battery casing 1 and enclose its bottom and side walls. Handles 18 are provided at opposite sides of the container whereby both the container and the battery may be carried as a unit. The purpose of the container is to catch and hold any leakage from the cells which may occur through the drain openings 11 due to a defective washer 14 or a loose plug 12. The container covers the projecting plug heads and prevents them from being accidentally turned to loosen the plugs.

In the modified form of the invention shown in Figs. 4 to 6 inclusive, the cells 19 are made separate and each includes an individual jar or casing 20 forming a chamber similar to the cell chambers 3 in the preferred form, and having a charging opening at the top and drain openings at the bottom closed by plugs. These jars are adapted to fit snugly, side by side, within a box-like container 21 open at the top and provided with lifting handles 22. The bottom of each cell casing 20 is formed with depending supporting flanges 23 which surround the projecting heads of the plugs for the drain openings and define pockets for said heads between the bottom of the cell casing and the bottom of the container 21.

What I claim is:

1. A multiple cell electric battery comprising a casing forming a plurality of cell chambers each adapted to hold battery plates; upstanding ribs located in the lower ends of the cell chambers and adapted to support the battery plates, said ribs being integrally formed with the bottom of the casing and the side walls of the cell chambers and dividing the lower end of each cell chamber into a plurality of pockets, the bottom of the casing being formed with a plurality of drain openings each leading from one of the said pockets; threaded closure members adapted to be applied at the under side of the bottom of the casing to close the drain openings; and supporting flanges integrally formed with the bottom of the casing and depending therefrom; said flanges being formed to support the casing in an upright position with its bottom elevated above a supporting surface to provide clearance beneath the bottom for the said closure members.

2. An electric battery comprising a casing forming a cell chamber adapted to hold battery plates; an upstanding rib located in the lower end of said cell chamber and adapted to support the battery plates, said rib being integrally formed with the bottom of the casing, and the side walls of the cell chamber and dividing the lower end of the cell chamber into a plurality of pockets, the bottom of the casing being formed with a plurality of drain openings each leading from one of the said pockets, threaded closure members adapted to be applied at the under side of the bottom of the casing to close the drain openings; and supporting flanges integrally formed with the bottom of the casing and depending therefrom, said flanges being formed to support the casing in an upright position with its bottom elevated above a supporting surface to provide clearance beneath the bottom for said closure members.

3. A multiple cell electric battery comprising a casing forming a plurality of cell chambers each adapted to hold battery plates; upstanding ribs located in the lower ends of the cell chambers and adapted to support the battery plates, said ribs being integrally formed with the bottom of the casing and the side wall of the cell chambers and dividing the lower end of each cell chamber into a plurality of pockets, the bottom of the casing being formed with a plurality of drain openings; each leading from one of the said pockets; threaded closure members adapted to be applied at the under side of the bottom of the casing to close the drain openings; supporting flanges integrally formed with the bottom of the casing and depending therefrom, said flanges being formed to support the casing in an upright position with its bottom elevated above a supporting surface to provide clearance beneath the bottom for said closure members; and a container for the casing formed to cover the bottom of the casing and extend upwardly over the sides thereof.

4. A multiple cell electric battery comprising a box-like casing formed integrally with vertical division walls dividing the casing into a plurality of cell chambers each adapted to hold battery plates; upstanding ribs extending transversely across the lower ends of the cell chambers and adapted to support the battery plates, said ribs being integrally formed with the bottom of the casing and the side walls of the cell chambers and dividing the lower ends of each chamber into a plurality of pockets, the bottom of the casing being formed with a plurality of drain openings each leading from one of said pockets; threaded closure members adapted to be applied to the under side of the bottom to close said drain openings; a depending skirt flange integrally formed with the bottom of the casing and extending around its outline, said flange being adapted to support the casing in an upright position with its bottom elevated above a supporting surface; and depending cross flanges integrally formed with the casing bottom and the skirt flange and extending across the bottom at right angles to each other, said cross flanges being disposed respectively in the same vertical planes with the upstanding ribs within the cell chambers and with the casing division walls and having their lower edges in the same horizontal plane with the lower edge of the skirt flange.

In testimony whereof I hereunto affix my signature.

JOHN LOUIS LANGE.